United States Patent Office 3,236,854
Patented Feb. 22, 1966

3,236,854
AZATHIOXANTHENE DERIVATIVES
Jacques Georges Robert, Sceaux, Seine, and Leonide Liakhoff, Vitry-sur-Seine, Seine, France, assignors to Rhone-Poulenc S.A., Paris, France, a French body corporate
No Drawing. Filed Aug. 31, 1962, Ser. No. 220,905
Claims priority, application France, Sept. 8, 1961, 872,727; June 13, 1962, 900,596
5 Claims. (Cl. 260—294.8)

This invention relates to new therapeutically useful derivatives of 1-azathioxanthene, to processes for their preparation, and to pharmaceutical compositions containing them.

According to the present invention, there are provided the new 1-azathioxanthene derivatives of the general formula:

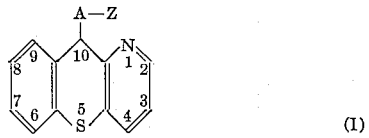

wherein A represents a straight or branched-chain alkylene group containing 2 to 6 carbon atoms and such that the carbon atom linked to the azathioxanthene nucleus is secondary or tertiary, and Z represents a dialkylamino group in which the alkyl groups contain not more than 6 carbon atoms, or a mononuclear saturated nitrogen-containing heterocyclic group attached through the nitrogen atom to the hydrocarbon group A such as pyrrolidino, piperidino or morpholino, and their acid addition and quaternary ammonium salts.

According to a feature of the present invention, the azathioxanthene derivatives of Formula I are prepared by the process which comprises reacting a reactive ester of the Formula X-A-Z (wherein X represents the acid residue of a reactive ester such as a halogen atom or a sulphuric or sulphonic ester residue, for example methanesulphonyloxy, benzenesulphonyloxy or toluene-n-sulphonyloxy, and A and Z are as hereinbefore defined) with an alkali metal derivative of 1-azathioxanthene of the formula:

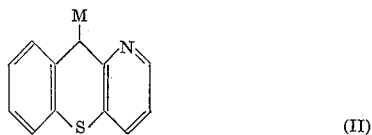

wherein M represents an alkali metal atom. The reaction is preferably carried out in an inert organic solvent such as an aromatic hydrocarbon (e.g., benzene or toluene) or an ether (e.g., diethyl ether or tetrahydrofuran), or mixtures of such solvents, at a temperature between 0° and 150° C. The lithium derivative of 1-azathioxanthene is advantageously employed as reactant, and the reaction effected at a temperature between 10° and 60° C.

According to a further feature of the invention, the azathioxanthene derivatives of Formula I are prepared by the process which comprises reacting a compound of the Formula HZ (Z being as hereinbefore defined) with an azathioxanthene derivative of the general formula:

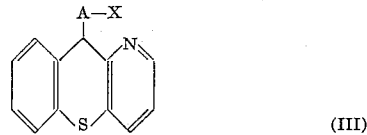

wherein A and X are as hereinbefore defined. The reaction is preferably carried out in an inert organic solvent selected from aromatic hydrocarbons (e.g., benzene) and alcohols (e.g., ethanol). It is particularly advantageous to carry out the reaction at the boiling point of the solvent employed in the presence of an excess of the basic compound HZ which serves as a condensing agent.

According to another feature of the invention, the azathioxanthene derivatives of Formula I in which the alkylene group A contains a methylene, i.e., —CH$_2$—, group adjacent the amino grouping Z are prepared by the process which comprises reducing the carbonyl group of an amide of the general formula:

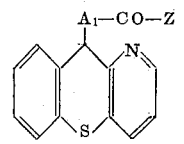

(wherein A$_1$ represents a straight- or branched-chain alkylene group containing 1 to 5 carbon atoms and is such that the group —A$_1$—CH$_2$— is the same as the group A, A and Z being as hereinbefore defined) to methylene by methods known per se. The reduction is preferably carried out with lithium aluminium hydride at ambient temperature or with gentle heating, for example at a temperature between 20° and 40° C., with or without an inert organic solvent such as an aromatic hydrocarbon (e.g., xylene) or an ether (e.g., tetrahydrofuran).

The amide starting materials of Formula IV may be prepared by methods known per se, for example, by the action of a carboxylic acid chloride of the general formula:

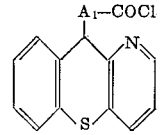

on a compound of the Formula HZ, A$_1$ and Z being as hereinbefore defined.

According to a still further feature of the invention, the azathioxanthene derivatives of Formula I are prepared by the reduction of alcohols of the general formula:

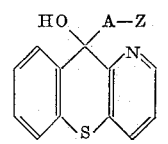

(wherein A and Z are as hereinbefore defined) by methods known per se for replacement of a hydroxyl group in an alkanol by a hydrogen atom. The reduction is preferably effected with hydriodic acid, or an iodine-containing compound producing hydriodic acid in situ, in an inert organic solvent such as acetic acid and in the presence of phosphorus.

The alcohols of Formula VI in which the alkylene group A contains a minimum of three carbon atoms in a straight chain between the group Z and the azathioxanthene nucleus may be obtained by the reaction of an organometallic derivative in which the organic portion is of the formula —A—Z (A and Z being as hereinbefore defined) with 1-aza-10-oxothioxanthene of the formula:

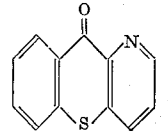

followed by hydrolysis of the product obtained. It is particularly advantageous to employ an organo-magnesium compound and to carry out the reaction in an inert organic solvent such as diethyl ether, tetrahydrofuran or benzene. The hydrolysis of the intermediate product is preferably effected under practically neutral conditions, in particular by means of an aqueous solution of ammonium chloride.

In accordance with another feature of this invention, the azathioxanthene derivatives of Formula I are prepared by the process which comprises the hydrogenation of ethylenically unsaturated compounds of the general formula:

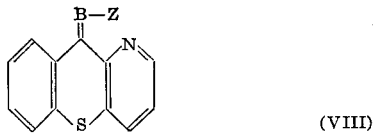

(VIII)

(wherein B represents a straight- or branched-chain alkanylylidene group containing 2 to 6 carbon atoms and Z is as hereinbefore defined) by methods known per se for hydrogenation of an ethylenic double bond in an alkene. The hydrogenation is preferably effected in the presence of a hydrogenation catalyst, for example, Raney nickel or Adams' platinum.

The compounds of Formula VIII may be obtained by dehydration of alcohols of Formula VI using methods known per se; in particular, by treatment with acetyl chloride in solution in chloroform, thionyl chloride, alcoholic hydrochloric acid, sulphuric acid, zinc chloride or potassium bisulphate.

Those azathioxanthene derivatives of Formula I in which the alkylene group A contains a minimum of three carbon atoms in a straight chain between the azathioxanthene nucleus and the group Z are, in accordance with another feature of the invention, prepared by the process which comprises reacting an organo-magnesium compound of the formula Hal-Mg-$A_2$-Z (wherein Hal represents a halogen atom, $A_2$ represents a straight- or branched-chain alkylene group containing 3 to 6 carbon atoms, at least three of which form a straight chain between the magnesium atom and the group Z, and Z is as hereinbefore defined) with a 1-aza-10-halogenothioxanthene of the formula:

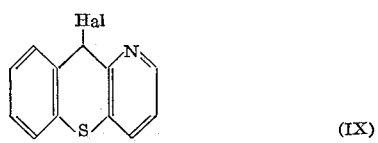

(IX)

wherein Hal is as hereinbefore defined. The reaction is preferably carried out in an inert organic solvent selected from aromatic hydrocarbons (e.g., benzene) and ethers (e.g., diethyl ether or tetrahydrofuran) at ambient temperature or with gentle heating.

The azathioxanthene derivatives of Formula I, which have an asymmetric carbon atom in the 10-position of the ring, are obtained by the foregoing processes in the form of racemic mixtures. The racemates may be separated into the optically active components by methods known per se, such as by the preparation of salts with optically active acids.

The compounds of Formula I obtained by the foregoing processes may be purified by physical methods such as distillation, crystallisation or chromatography, or by chemical methods such as the formation of an acid addition salt, crystallisation of such a salt from a suitable medium and decomposition of the salt in an alkaline medium. In the aforesaid chemical method the nature of the anion of the salt is immaterial, the only requirements being that the salt should be well-defined and easily crystallisable.

The azathioxanthene derivatives of Formula I may be converted by known methods into acid addition and quaternary ammonium salts. The acid addition salts may be obtained by the action of acids on the azathioxanthene derivatives in appropriate solvents. As organic solvents there may be used, for example, alcohols, ethers, ketones or chlorinated hydrocarbons; water may advantageously be used as an inorganic solvent. The acid addition salt which is formed is precipitated, if necessary after concentration of its solution, and is separated by filtration or decantation. The quaternary ammonium salts may be obtained by the action of esters on the azathioxanthene derivatives, optionally in an organic solvent at room temperature, or more rapidly, with gentle heating.

In this specification the term "methods known per se" means methods heretofore used or described in the chemical literature.

The new azathioxanthene derivatives of general Formula I and their non-toxic acid addition and quaternary ammonium salts possess pharmacological properties; in particular, they are very active as antihistaminics, spasmolytics, antitussives and analgesics. Compounds of importance are those in which Z represents a dimethylamino group; in particular 1-aza-10-(3-dimethylamino-1-propyl)thioxanthene, 1-aza-10-(3-dimethylamino-2-methylpropyl)thioxanthene, 1-aza-10-(2-dimethylamino-1-ethyl)thioxanthene and 1-aza-10-(2-dimethylamino-1-propyl)thioxanthene—the first-mentioned compound being of outstanding importance—and their non-toxic acid addition and quaternary ammonium salts.

For therapeutic purposes, the bases of general Formula I are preferably employed as such or in the form of non-toxic acid addition salts, i.e., salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, citrates, tartrates, theophyllinates, theophyllinacetates, salicylates, phenolphthalinates, methanesulphonates, ethanedisulphonates, and methylene-bis-β-hydroxy-naphthoates) so that the beneficial physiological properties inherent in the bases are not vitiated by side-effects ascribable to the anions. They may also be employed in the form of non-toxic quaternary ammonium salts obtained by reaction with organic halides (e.g., methyl, ethyl, allyl or benzyl chloride, bromide or iodide) or other reactive esters, e.g., methyl or ethyl sulphate, benzenesulphonate or toluene-p-sulphonate.

The following examples illustrate the invention.

*Example I*

A mixture of 1-aza-10-hydroxy-10-(3-dimethylamino-1-propyl)thioxanthene (0.9 g.), 57% hydriodic acid (2.9 cc.), glacial acetic acid (2.9 cc.) and red phosphorus (0.4 g.) is heated under reflux with stirring for 3 hours. The dark red solution obtained is allowed to stand for 15 hours. After filtration to remove excess red phosphorus, the solution is concentrated under slightly reduced pressure to half the original volume. The concentrate is taken up in water (20 cc.) and then made alkaline with 10 N sodium hydroxide solution (5 cc.) in the presence of benzene (25 cc.). The solution obtained is decanted and the aqueous phase extracted with benzene (25 cc.). The combined benzene extracts are filtered, treated with a solution of sodium hyposulphite (2.5 g.) in water (50 cc.) to remove the iodine, dried over anhydrous potassium carbonate, filtered and evaporated to dryness in vacuo. The oily residue obtained (0.617 g.) is dissolved in a mixture of cyclohexane (98 cc.) and benzene (2 cc.), and the solution obtained is filtered through a column of special chromatographic alumina (18.5 g.). Elution is carried out with a cyclohexane-benzene (98:2) mixture and the solvents are evaporated, giving 1-aza-10-(3-dimethylamino-1-propyl)thioxanthene (0.296 g.) in the form of a yellow oil, the oxalate of which, prepared in acetone and recrystallised from ethanol, melts at 189° C.

The 1-aza - 10 - hydroxy - 10 - (3 - dimethylamino-1-propyl)thioxanthene starting material is prepared as follows:

Magnesium turnings (6 g.) and anhydrous diethyl ether (3.3 g.) are added successively to anhydrous tetrahydrofuran (13.5 cc.) followed, with stirring under a current of dry nitrogen, by mercuric chloride (0.33 g.). A crystal of iodine and ethyl bromide (3 cc.) are added to the mixture obtained, followed over 1 hour 30 minutes by a solution (124 cc.) of 1-chloro-3-dimethylaminopropane (25.8 g.) in anhydrous tetrahydrofuran, the temperature being kept below 45° C. After further stirring for 2 hours, the reaction mixture obtained is then poured, after filtration, into a suspension of 1-aza-10-oxo-thioxanthene (9.7 g.) (prepared from 2-carboxy-3-phenylthiopyridine according to S. Kruger and F. G. Mann, J. Chem, Soc., p. 3906 (1954)), in anhydrous tetrahydrofuran (230 cc.). The temperature rises to 50° C. and a violet solution forms. After heating at 50° C. for 2 hours, the solution is allowed to cool for 15 hours. A solution, cooled to about 0° C., of ammonium chloride (16.4 g.) is distilled water (250 cc.) is then added with stirring and the solution obtained decanted. The aqueous layer is washed with diethyl ether (4 x 300 cc.). The organic solutions are combined, washed with water and then dried over anhydrous potassium carbonate. The solvents are evaporated and the oil obtained (15 g.) is dissolved in cyclohexane (750 cc.). The solution is filtered through a column containing special chromatographic alumina (310 g.) and eluted with cyclohexane followed by a benzene-cyclohexane (1:9) mixture. The solvents are evaporated, giving 1-aza-10-hydroxy-10-(3-dimethylamino-1-propyl)thioxanthene (9.4 g.) in the form of a yellow oil. The oxalate, prepared in acetone and recrystallized from ethanol, melts at 177–178° C.

*Example II*

1 - aza - 10 - (3 - dimethylamino - 1 - propylidene)thioxanthene (4.1 g.) is dissolved in ethanol (50 cc.) and hydrogenated at laboratory temperature and pressure in the presence of Adams' platinum (1.1 g.) and ethanol (50 cc.). The absorption of hydrogen takes 11 hours. After filtering off the catalyst, the ethanol is evaporated and the residual oil (4.027 g.) dissolved in acetone (100 cc.). The solution obtained is filtered and then treated with a solution of oxalic acid (1.27 g.) in acetone (23 cc.). A product crystallizes and, after cooling, the crystals are separated, washed with acetone and diethyl ether and dried, giving 1-aza-10-(3-dimethylamino-1-propyl)-thioxanthene oxalate (4.7 g.), M.P. 187–189° C. after recrystallisation from ethanol.

The 1 - aza - 10 - (3 - dimethylamino-1 - propylidene)-thioxanthene starting material is obtained as follows:

Acetyl chloride (3.35 g.) is added with stirring to a solution of 1-aza-10 - hydroxy - 10 - (3 - dimethylamino-1-propyl)thioxanthene (3.2 g.) in chloroform (ethanol-free; 16 cc.). The reaction mixture is heated for 1 hour under reflux. The solvent is then evaporated under slightly reduced pressure, giving a dark brown residue (4.5 g.) which is then dissolved in distilled water (30 cc.). The solution obtained is treated with decolourising charcoal, filtered and made alkaline with 5N sodium hydroxide solution (10 cc.). An oil forms which is extracted with diethyl ether. The ethereal solution obtained is dried over sodium sulphate and evaporated to dryness in vacuo. 1-aza - 10 - (3 - dimethylamino - 1-propylidene)thioxanthene (2.107 g.) is thus obtained in the form of a light brown oil. This oil is dissolved in acetone (20 cc.) and treated with a solution of picric acid (1.715 g.) in acetone (10 cc.). A product crystallises and, after cooling, the crystals are separated, washed with diethyl ether and dried. 1-Aza - 10 - (3 - dimethylamino - 1 - propylidene)thioxanthene picrate (3.6 g.), M.P. 192–193° C., is thus obtained. The oxalate, prepared in acetone and recrystallised from ethanol, melts at 172° C.

*Example III*

A mixture of 1-aza-10-hydroxy-10-(3 - dimethylamino-2-methylpropyl)thioxanthene (9.5 g.), 57% hydriodic acid (30 cc.), glacial acetic acid (30 cc.) and red phosphorus (3.7 g.) is heated under reflux for 3 hours with stirring. After cooling, the phosphorus is separated by filtration, and the solution diluted with water (120 cc.), made alkaline with sodium hydroxide solution ($d=1.33$; 60 cc.), and extracted with methylene chloride (400 cc.). The organic solution is dried over potassium carbonate and evaporated to dryness under reduced pressure (20 mm. Hg). The residue obtained (9 g.) is dissolved in cyclohexane (180 cc.), the solution filtered through a column of alumina (180 g.), 3 cm. in diameter and 40 cm. in height, and eluted with cyclohexane (3 litres).

By evaporation to dryness of the combined eluates, 1-aza-10-(3 - dimethylamino - 2 - methylpropyl)thioxanthene (6.4 g.) is obtained in the form of a pale yellow oil. The oxalate, prepared in acetone, is a white crystalline powder, M.P. 188–190° C.

The 1 - aza - 10 - hydroxy - 10 - (3 - dimethylamino-2-methylpropyl)thioxanthene used as starting material is prepared by the condensation of 3-dimethylamino-2-methylpropyl magnesium chloride with 1-aza-10-oxo-thioxanthene. It is a pale yellow oil the oxalate of which is a white crystalline powder, M.P. 146–148° C.

*Example IV*

A solution of butyl-lithium is prepared from lithium (1.2 g.) and butyl bromide (9.6 g.) in anhydrous diethyl ether (45 cc.). The solution is poured over a period of 13 minutes into a suspension of 1-aza-thioxanthene (12 g.) in anhydrous diethyl ether (240 cc.). The reaction is exothermic and takes the solvent to reflux temperature, and heating under reflux is continued for 1 hour 30 minutes. After cooling to about 20° C., a solution of 1-chloro-2-dimethylaminoethane (7.1 g.) in anhydrous diethyl ether (25 cc.) is poured in over a period of 10 minutes and the mixture heated under reflux for 3 hours. The solution obtained is washed with water, dried over anhydrous potassium carbonate and concentrated to dryness under reduced pressure (20 mm. Hg). The residue obtained (15.6 g.) is dissolved in cyclohexane (300 cc.), and the solution filtered through a column of alumina (300 g.) 3.5 cm. in diameter and 30 cm. in height and eluted with cyclohexane (2.5 litres), followed by a cyclohexane-benzene (9:1) mixture (2 litres), a cyclohexane-benzene (1:1) mixture (3 litres) and finally with pure benzene (4 litres).

By evaporation to dryness of the combined eluates, 1-aza-10-(2-dimethylamino-1-ethyl)thioxanthene (9 g.) is obtained in the form of a pale yellow oil. The oxalate, prepared in acetone, is a white crystalline powder and melts at 211–213° C.

The 1-aza-thioxanthene starting material, M.P. 90–91° C., is obtained by reducing 1-aza-10-oxo-thioxanthene with hydrazine hydrate in triethylene glycol in the presence of concentrated potassium hydroxide solution.

*Example V*

Proceeding as in Example IV with lithium (1.85 g.), butyl bromide (14.8 g.), 1-aza-thioxanthene (18.5 g.) and 2-chloro-1-dimethylaminopropane (12.4 g.), a crude product (20 g.) is obtained which is dissolved in cyclohexane (400 cc.) and purified by chromatography through a column of alumina (400 g.) 3.5 cm. in diameter and 40 cm. in height and eluted with cyclohexane (10 litres). 1-aza-10-(2-dimethylamino-1-propyl)thioxanthene (4.5 g.) is thus obtained in the form of a pale yellow oil, the oxalate of which, prepared in isopropanol, is a creamy white crystalline powder, M.P. 167–169° C.

The present invention further includes within its scope pharmaceutical compositions which comprise one or more compounds of general Formula I or non-toxic acid addition or quaternary ammonium salts thereof together with a pharmaceutical carrier or coating. In clinical practice the compounds of the present invention will normally be administered orally, parenterally or rectally.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g., lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersion agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cocoa butter or a suitable wax base.

The percentage of active ingredient in the compositions of the invention may be varied, it being necessary that it should constitute a proportion such that a suitable dosage for the therapeutic effect desired shall be obtained. In human therapy the compositions should generally be administered so as to give to an adult, in the case of oral administration, 1 to 200 mg. of active substance (calculated as base) per day.

The following examples illustrate pharmaceutical compositions according to the invention.

*Example VI*

Tablets are prepared having the following composition:

|  | Mg. |
|---|---|
| 1-aza-10-(3-dimethylamino-1-propyl)thioxanthene oxalate | 13 |
| Starch | 102 |
| Powdered silica | 32 |
| Magnesium stearate | 3 |

*Example VII*

Tablets are prepared containing 5 mg. of active ingredient having the following composition:

|  | Mg. |
|---|---|
| 1-aza-10-(2-dimethylamino-1-ethyl)thioxanthene oxalate | 6.7 |
| Starch | 105 |
| Powdered silica | 35 |
| Magnesium stearate | 3.3 |

We claim:
1. 1-azathioxanthene derivatives of the formula:

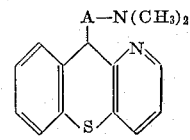

wherein A represents an alkylene group containing 2 to 6 carbon atoms and such that the carbon atom linked to the azathioxanthene nucleus is one of secondary and tertiary, and their non-toxic acid addition and quaternary ammonium salts.
2. 1-aza-10-(3-dimethylamino-1-propyl)thioxanthene.
3. 1-aza-10-(3-dimethylamino-2-methylpropyl)-thioxanthene.
4. 1-aza-10-(2-dimethylamino-1-ethyl)thioxanthene.
5. 1-aza-10-(2-dimethylamino-1-propyl)thioxanthene.

References Cited by the Examiner

UNITED STATES PATENTS

| 2,368,006 | 1/1945 | Cusic | 260–328 |
| 2,676,971 | 4/1954 | Cusic et al. | 260–328 |
| 2,691,657 | 10/1954 | Coombs et al. | 260–294.8 |
| 2,913,458 | 11/1959 | Druey et al. | 260—294.8 |
| 2,951,082 | 8/1960 | Sprague et al. | 260—328 |
| 3,038,896 | 6/1962 | Habicht et al. | 260—294.8 |
| 3,086,972 | 4/1964 | Jucker et al. | |

FOREIGN PATENTS

| 220,921 | 9/1957 | Australia. |
| 224,809 | 1/1959 | Australia. |
| 815,346 | 10/1951 | Germany. |
| 354,442 | 7/1961 | Switzerland. |

OTHER REFERENCES

Bernthesen et al., "Organic Chemistry," 4th edition, pages 681–89 (Blackie) (1941).

WALTER A. MODANCE, *Primary Examiner.*

IRVING MARCUS, *Examiner.*